(12) United States Patent
Hsin et al.

(10) Patent No.: US 6,970,321 B2
(45) Date of Patent: Nov. 29, 2005

(54) AUTOMATIC MODEL REGULATION IN A DISC DRIVE SERVO SYSTEM USING MODEL REFERENCE INVERSE

(75) Inventors: Yi-Ping Hsin, Burnsville, MN (US); Samir Mittal, Longmont, CO (US); John Christopher Morris, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 501 days.

(21) Appl. No.: 10/043,427

(22) Filed: Jan. 10, 2002

(65) Prior Publication Data

US 2003/0081342 A1 May 1, 2003

Related U.S. Application Data

(60) Provisional application No. 60/345,111, filed on Oct. 23, 2001.

(51) Int. Cl.$^7$ ............................................... G11B 5/596
(52) U.S. Cl. ..................................... 360/78.09; 360/75
(58) Field of Search ............................... 360/75, 77.02, 360/78.01, 78.04, 78.07, 78.09, 55, 65, 77.04

(56) References Cited

U.S. PATENT DOCUMENTS

| | | | | |
|---|---|---|---|---|
| 5,155,422 A | * | 10/1992 | Sidman et al. | 318/560 |
| 5,325,247 A | * | 6/1994 | Ehrlich et al. | 360/78.09 |
| 5,369,345 A | * | 11/1994 | Phan et al. | 318/561 |
| 5,774,299 A | | 6/1998 | Baum et al. | 360/77.08 |
| 6,072,654 A | | 6/2000 | Eddy | 360/77.04 |
| 6,101,058 A | | 8/2000 | Morris | 360/69 |
| 6,204,988 B1 | | 3/2001 | Codilian et al. | 360/75 |
| 6,246,536 B1 | | 6/2001 | Galloway | 360/78.04 |
| 6,614,615 B1 | * | 9/2003 | Ju et al. | 360/78.04 |

* cited by examiner

Primary Examiner—David Hudspeth
Assistant Examiner—Jason Olson
(74) Attorney, Agent, or Firm—David K. Lucente; Derek J. Berger

(57) ABSTRACT

An equalization filter for counteracting the effects of unwanted resonance modes and noise in the VCM plant. The filter comprises a transfer function derived from a function of the actual VCM plant response and an ideal response, for which the servo controller is designed. The response of the combined equalization filter and the actual VCM plant response substantially adheres to the ideal response. The disc drive includes firmware operable to generate one or more equalization filters for each of one or more heads.

21 Claims, 7 Drawing Sheets

AUTOMATIC MODEL REGULATION IN A DISC DRIVE SERVO SYSTEM USING MODEL REFERENCE INVERSE

This application claims priority of U.S. provisional application Ser. No. 60/345,111, filed Oct. 23, 2001.

FIELD OF THE INVENTION

This application relates generally to disc drives and more particularly to automatic model regulation in a servo system using model reference inverse.

BACKGROUND OF THE INVENTION

Disc drives are data storage devices that store digital data in magnetic form on a rotating storage medium on a disc. Modem disc drives comprise one or more rigid discs that are coated with a magnetizable medium and mounted on the hub of a spindle motor for rotation at a constant high speed. Information is stored on the discs in a plurality of concentric circular tracks typically by an array of transducers ("heads") mounted to a radial actuator for movement of the heads relative to the discs. Each of the concentric tracks is generally divided into a plurality of separately addressable data sectors. The read/write transducer, e.g. a magnetoresistive read/write head, is used to transfer data between a desired track and an external environment. During a write operation, data is written onto the disc track and during a read operation the head senses the data previously written on the disc track and transfers the information to the external environment. Critical to both of these operations is the accurate locating of the head over the center of the desired track.

A problem in disc drives that limits drive performance in general and head position accuracy specifically is component vibration or resonance. Components in the voice coil motor (VCM) plant of the disc drive exhibit resonance modes that adversely affect the performance of disc drive components. For example, because of resonance in the actuator arm, the transducer heads may not be positioned directly over the desired tracks indicated by the servo control of the disc drive. This problem is exacerbated by the recent push to increase the tracks-per-inch (TPI) on the disc surfaces. When TPI is increased, the room for margin in head placement becomes disproportionately smaller, and servo positioning errors become more frequent.

Unfortunately, resonance modes in the VCM structure cannot be completely eliminated without extreme cost. The presence of resonance modes in the VCM structure usually causes stability problems in the servo control loop. To overcome these problems, the servo controller is typically augmented with one or more notch filters. The notch filters attenuate the VCM structure response at the natural frequencies of the resonance modes. This combination of the servo controller with the notch filters preserves servo control loop stability but at the expense of closed loop performance.

In a traditional design, a set of fixed notch filters are designed and implemented for a large population of disc drives in a given drive family. In high TPI disc drives, the resonance modes tend to vary both from disc drive to disc drive within the population, and from head to head within each disc drive. Therefore, the fixed notch filters cannot guarantee that the resonance modes will be attenuated for all heads and all drives in the population for which they were designed. This reduces the effectiveness of the notch filters, and results in an increased rejection rate of disc drives.

Ideally, the notch filters will be specifically designed for each head of each individual disc drive. Recently, a method of notch filtering on a per-head basis was disclosed in U.S. Pat. No. 6,246,536, entitled "Notch Filtering as Used in a Disc Drive Servo," issued to Paul Galloway, which is hereby incorporated for all that it teaches and discloses. Unfortunately, even with the Galloway solution, the inherent problems still persist with the use of notch filters. Essentially, notch filters cannot guarantee that the performance criteria will be met in the servo control loop. Two important performance criteria are servo bandwidth and servo runout, or positioning error. When more notch filters are added, for example, phase margin is reduced, which amplifies disturbances in the servo control loop. The amplified disturbances make the servo control loop prone to runout. Thus, while the use of notch filters with a servo controller can provide more stability in the servo control loop, they do so at the cost of performance.

Accordingly, there is a need for a method and apparatus for regulating the response of the VCM plant in a disc drive servo control loop to reduce the effects of unwanted resonance modes, guarantee loop stability, and minimize degradation of servo loop performance, without relying on the mechanism of notch filters.

SUMMARY OF THE INVENTION

Against this backdrop, embodiments of the present invention have been developed. An embodiment of the present invention is a unique method and system for substantially offsetting the effects of unwanted resonance in the VCM plant in a disc drive servo loop. More specifically, an embodiment is an equalization filter that regulates the VCM transfer function such that the response to the output from the servo controller substantially adheres to a predetermined ideal response.

Embodiments of the invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages which characterize embodiments of the present invention will be apparent from a reading of the following detailed description and a review of the associated drawings.

DETAILED DESCRIPTION

Figure 1:
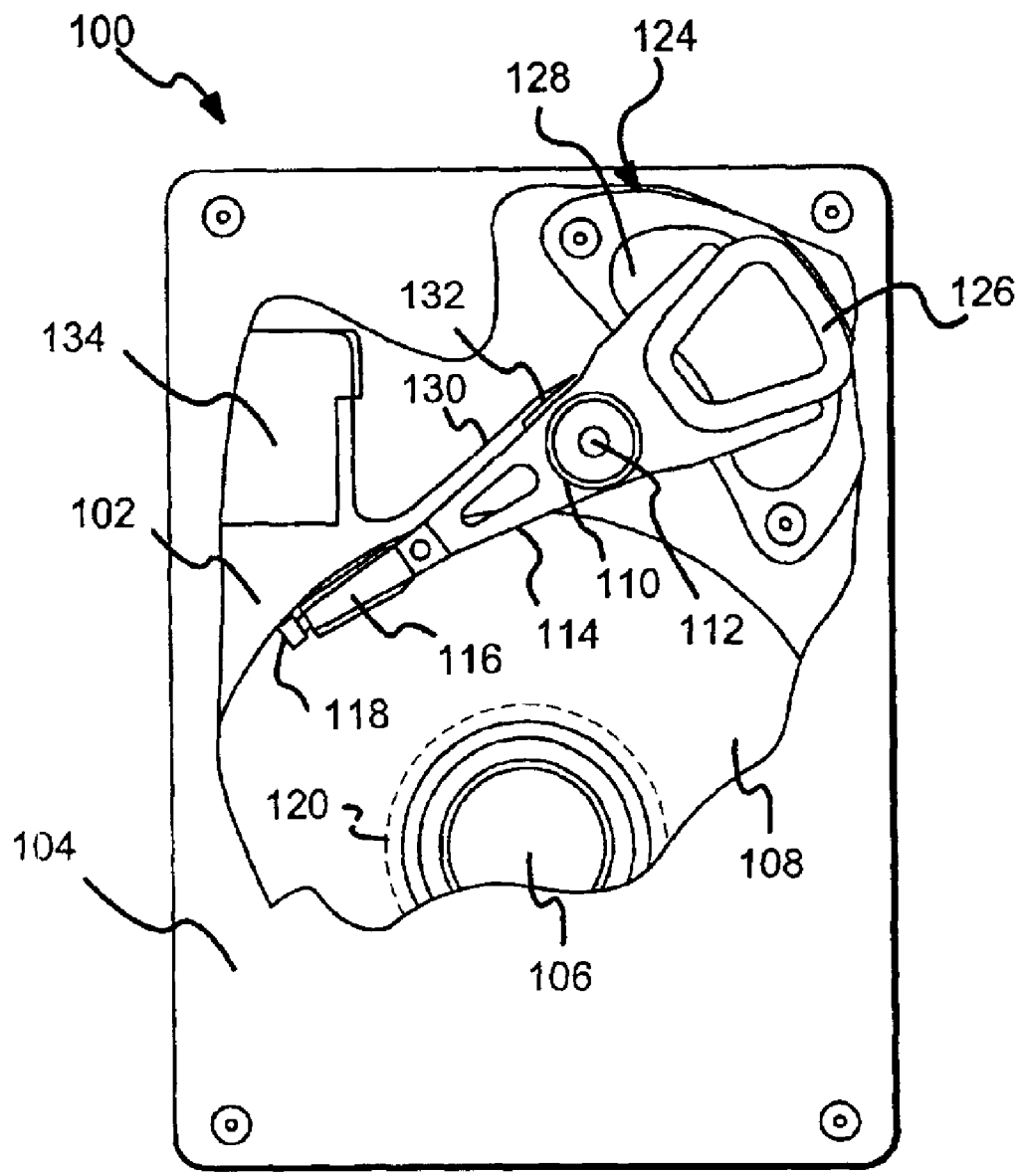
FIG. 1 is a plan view of a disc drive incorporating a preferred embodiment of the present invention showing the primary internal components.

The invention is described in detail below with reference to the drawing figures. When referring to the figures, like structures and elements shown throughout are indicated with like reference numerals.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118, which includes an air bearing slider, enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100. The disc drive 100 further includes a drive controller 210 (FIG. 2), which is operable to be coupled to a host system or another controller that controls a plurality of drives. In an illustrative embodiment, the drive controller 210 is a microprocessor, or digital signal processor. The drive controller 210 is either mountable within the disc drive 100, or is located outside of the disc drive 100 with suitable connection to the actuator assembly 110.

Figure 2:
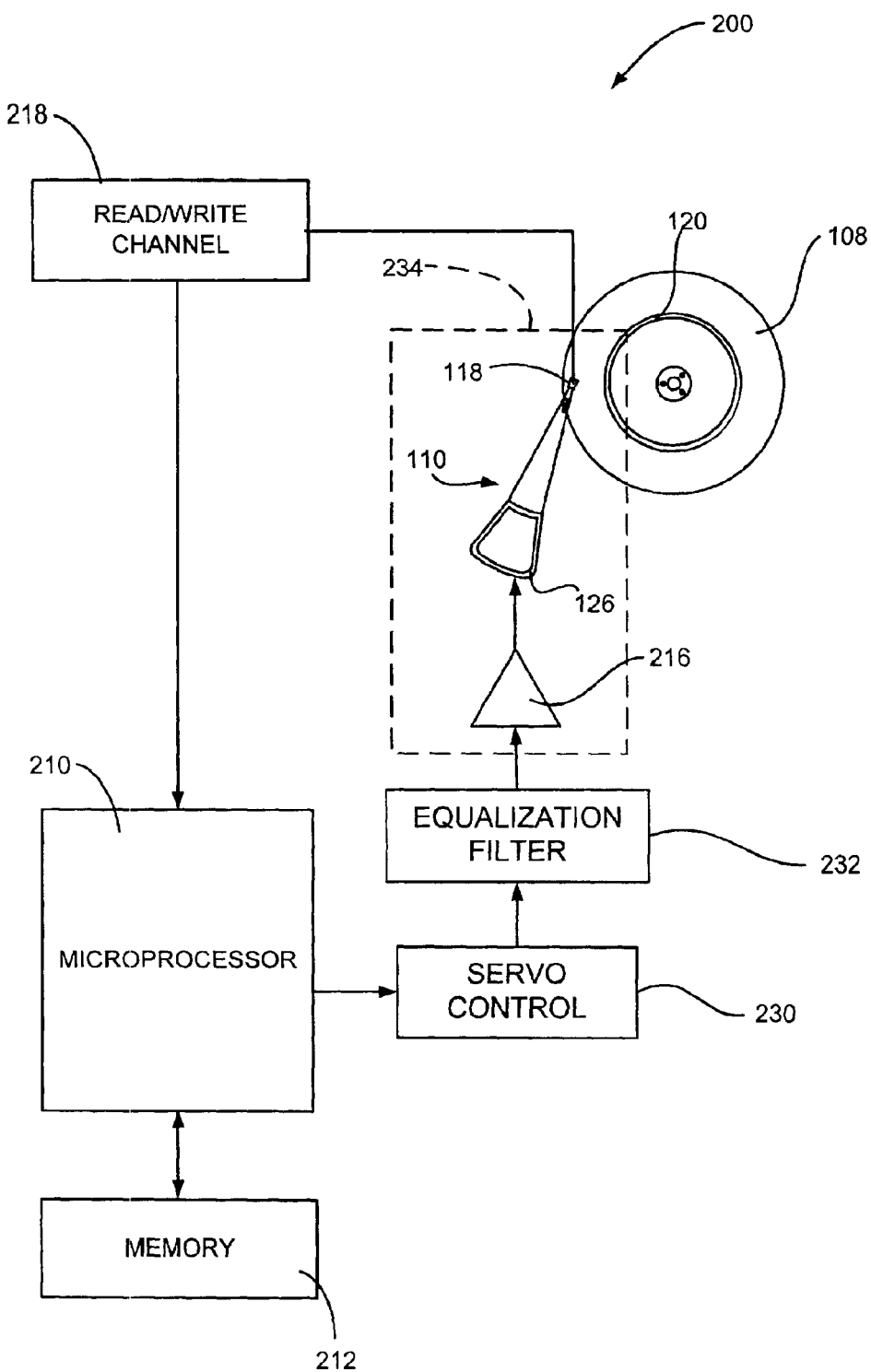
FIG. 2 illustrates a functional block diagram of what is commonly referred to as the servo loop of the disc drive.

FIG. 2 illustrates a functional block diagram of what is commonly referred to as the servo loop 200 of the disc drive 100, employing an embodiment of the present invention. In general, the servo loop 200 includes a disc drive microprocessor 210 having an associated memory 212, a servo control module 230, an equalization filter 232, a transconductance amplifier 216, a VCM plant 234, and a read/write channel 218. The VCM plant 234 generally includes the actuator assembly 110, the transducer heads 118, the trans-conductance amplifier 216, and the VCM 124. The VCM plant 234 is also referred to as the VCM actuator system. In operation, the microprocessor 210 typically receives a seek command from a host computer (not shown) that indicates that a particular track 120 on the discs 108 is to be accessed. In response to the seek command, the microprocessor 210 determines an appropriate velocity or seek profile to move the head from its current position to the track that is to be accessed. The seek profile is then sent to the transconductance amplifier 216 for amplification. The transconductance amplifier 216 then provides a driving current corresponding to the seek profile to the coil 126. In response to the driving current, the actuator assembly 110 accelerates toward the target track and then decelerates and stops the actuator assembly 110 when the head 118 is over the target track and the seek operation is completed.

The head 118 settles on the target track at the end of the seek operation. Then, a track follow command is received by the microprocessor 210. During the track follow operation, the servo control 230 functions to hold the head as close to the center of the target track as possible as data is read from and/or written to the target track. The servo control 230 senses servo control data from the target track. Servo control data on the track includes a Position Error Signal (PES) that the servo control 230 uses to monitor how far the head 118 is from the center of the track. In response to a deviation from the center of the track, the servo control 230 sends a control signal to the plant 234 to correct for the deviation. As is discussed in more detail herein, before the plant 234 receives the control signal, the equalization filter 232 filters the control signal to offset, balance, or equalize the effects of unwanted resonance in the plant 234.

In the embodiment shown in FIG. 2, and other embodiments described herein, the logical operations of the equalization filter 232 and the servo control module 230 may be implemented as a sequence of computer implemented steps or program modules running on a microprocessor, such as, microprocessor 210. It will be understood to those skilled in the art that the equalization filter 232 may also be implemented as interconnected machine logic circuits or circuit modules within a computing system. Additionally, the servo control module may be implemented in a separate component of the disc drive 100, such as a dedicated servo controller. The implementation is a matter of choice dependent on the performance and design requirements of the disc drive 100. As such, it will be understood that the operations, structural devices, acts, and/or modules described herein may be implemented in software, in firmware, in special purpose digital logic, and/or any combination thereof without deviating from the spirit and scope of the present invention as recited within the claims attached hereto. Furthermore, the various software routines or software modules described herein may be implemented by any means as is known in the art. For example, any number of computer programming languages, such as "C", "C++", Pascal, FORTRAN, assembly language, Java, etc., may be used. Furthermore, various programming approaches such as procedural, object oriented or artificial intelligence techniques may be employed.

In this embodiment, the computer implemented steps and corresponding digital data that comprise the operations of the equalization filter 232 are stored in some form of computer readable media. As used herein, the term computer-readable media may be any available media that can be accessed by a processor or component that is executing the functions, steps and/or data of the equalization filter 232. By way of example, and not limitation, computer-readable media might comprise computer storage media and/or communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computer or processor which is executing the operating code. Computer-readable media may also be referred to as computer program product.

Figure 3:
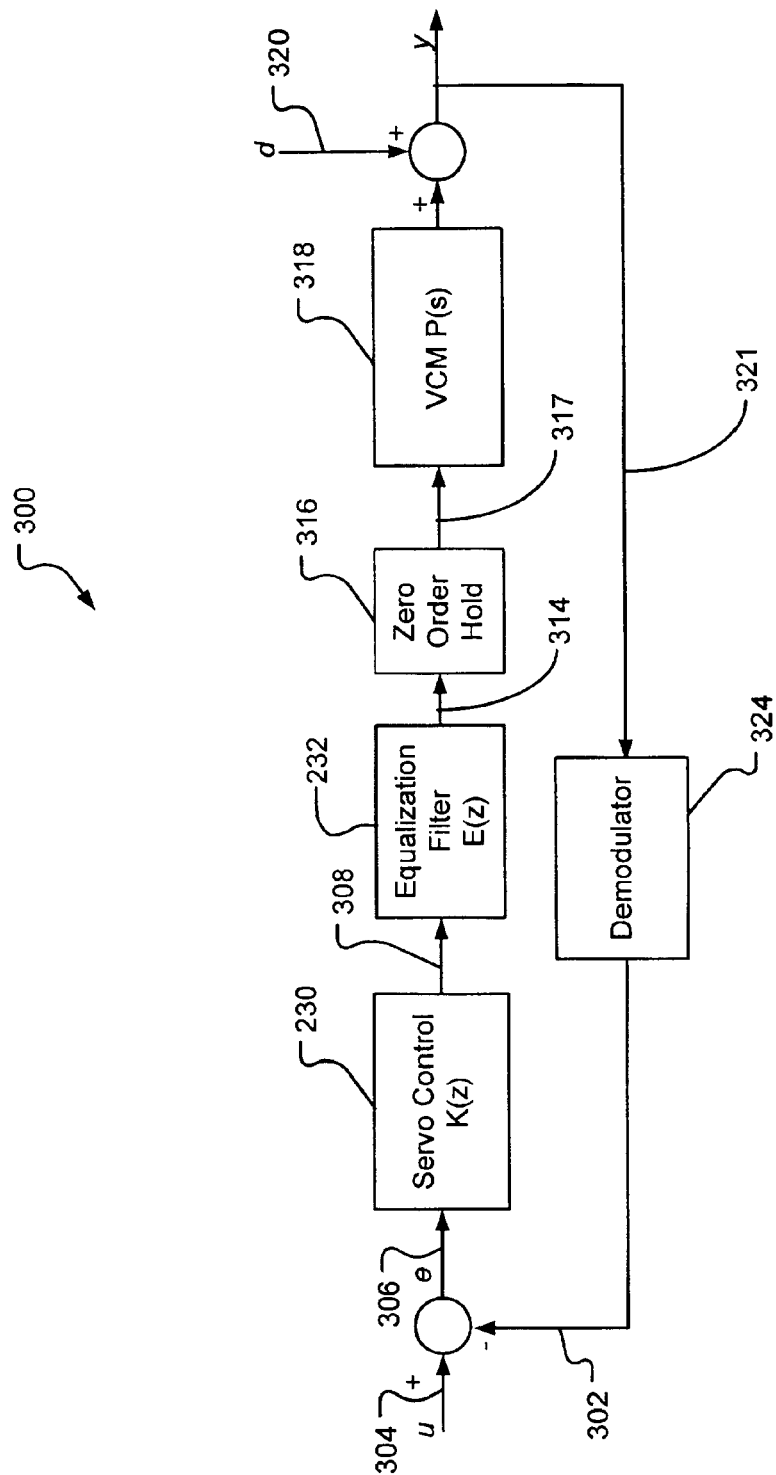
FIG. 3 illustrates a portion of the servo loop shown in FIG. 2.

FIG. 3 illustrates an analytical model 300 of a portion of the servo loop 200 employing an equalization filter 232 according to an illustrative embodiment. As can be seen, each of the modules in the portion of the servo loop includes an associated transfer function. The servo control module 230 has a discrete-time domain transfer function K(z). The equalization filter 232 has a discrete-time domain transfer function E(z). The VCM has a continuous-time domain transfer function P(s). The natures of the transfer functions K(z), E(z), and P(s), dictate how each of their associated modules will respond to input signals. During operation, a Position Error Signal (PES) 302 is generated by the demodulator 324. The PES 302 is negated from a reference signal 304 to obtain an error signal 306. The error signal 306 is input to the servo control module 230, which outputs a control signal 308. The control signal 308 is transmitted to the equalization filter 232, which filters the control signal 308 using the transfer function E(z). The output of the equalization filter 232 is a digital equalized signal 314, which is transmitted to a Zero Order Hold (ZOH) module 316. The ZOH module 316 converts the digitized equalized signal 314 into an analog equalized signal 317, which is sent to the VCM 318. The VCM 124 may be viewed as having a transfer function P(s) as illustrated by the VCM transfer function 318.

The VCM transfer function 318 exhibits a response to the analog equalized signal 317. The response from the VCM transfer function 318 is combined with a disturbance signal 320. The disturbance signal 320 represents disturbances to the output of the VCM transfer function 318 due to disc 108 vibration and wind induced VCM actuator vibration. The combination of the output of the VCM transfer function 318 and the disturbance signal 320 is a head motion signal 321. The head motion signal 321 is generally the position of the transducer head 118 adjacent the disc surface 108. The head motion signal 321 is sent to the demodulator 324, which uses the head motion signal 321 to sense the position of the head 118 relative to the center of a target track on the disc 108. The demodulator 324 generates a track identifier identifying the target track, and a PES 302, indicating how far the head 118 is from the center of the target track. The PES 302 is fed back into the loop 200 to generate the next error signal 306. During a track follow operation, the equalization filter 232 compensates for resonance in the VCM plant 234 so that the response as seen by the servo control 230 is substantially ideal. An ideal response is shown in FIG. 4 in comparison to an equalized response and a non-equalized head response to illustrate the effect of the equalization filter 232.

The variation of the PES 302 indicates the vibration of the transducer head 118, or the response of the transducer head 118 to the analog equalized signal 314. The response of the transducer head 118 may be viewed as an aggregation of responses of all the components in the VCM plant 234, as well as the disturbance signal 320. The servo control module 230 is designed to handle a particular response of the VCM plant 234, as the response is fed back to the servo control module 230 in the PES 302.

Figure 4:
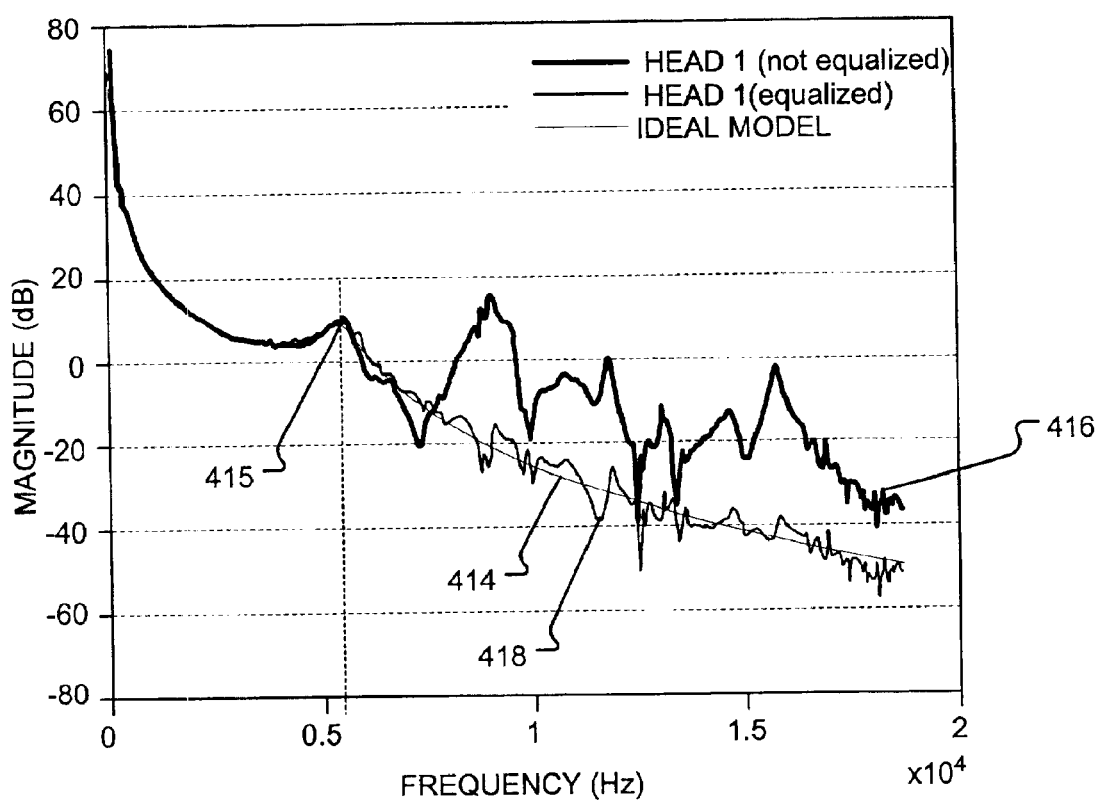
FIG. 4 is a bode plot showing frequency response of the voice coil motor in a disc drive an embodiment of the present invention.

FIG. 4 is a Bode plot 400 showing three frequency responses of a VCM actuator system, such as the VCM plant 234. For clarity, the phase information has been removed from the Bode plot 400 and the plot is not shown to scale. The x-axis 410 represents the frequency of the output signal, while the y-axis 412 represents the VCM system gain in decibels (dB). Shown in the Bode plot 400 are an ideal frequency response 414, a non-equalized frequency response 416 (darker line), and an equalized frequency response 418. The ideal frequency response 414 is the frequency response of an ideal VCM plant model. The ideal VCM plant model is the model for which the servo control module 230 has been designed. Generally, the ideal VCM plant model includes one or more fundamental resonance modes 415 that are impractical to remove from the VCM plant. The transfer function for the ideal VCM plant model is discussed in detail below. The ideal transfer function may be generated analytically and its associated ideal frequency response 414 may be generated from the analytical model utilizing mathematical software tools known in the art.

The non-equalized frequency response 416 was experimentally obtained from a disc drive servo loop that did not employ an equalization filter 232. The equalized frequency response 418 was experimentally obtained from a disc drive servo control loop utilizing an embodiment of the equalization filter 232. Head 1 was used to generate both the non-equalized frequency response 416 (without an equalization filter 232) and the equalized frequency response 418 (with an equalization filter 232). To generate both the non-equalized frequency response 416 and the equalized frequency response 418, a sinusoidal signal is input to the servo control loop at a range of frequencies.

As is typical, each of the mechanical components of the VCM plant in the disc drive 100 may have various resonant modes that, if excited by an energy source, will cause the mechanical components to oscillate at the natural resonance frequencies of the component. Due to the presence of unwanted resonant modes in the VCM plant of the disc drive 100, the non-equalized frequency response 416 does not track the ideal response 414 very closely. As can be seen, the equalized response of head zero 418 substantially follows the ideal response 414.

Various methods of implementing an equalization filter 232 may be used with respect to this embodiment. The equalization filter 232 may be mathematically represented in the general form:

$$E_m(z) = \frac{\tilde{P}(z)}{P_m(z)}, \tag{1}$$

where $E_m(z)$ is the transfer function for the equalization filter 232 for the $m^{th}$ head, $P_m(z)$ is the discrete-time domain transfer function for the $m^{th}$ head of the actual VCM plant 234, $\tilde{P}(z)$ is a discrete-time domain ideal transfer function for an ideal VCM plant, and m is a head number.

Equation (1) represents $E_m(z)$ being determined by computing a relative difference between the actual VCM plant response, $P_m(z)$, and an ideal VCM plant response, $\tilde{P}(z)$. By implementing the relative difference in the equalization filter 232, the equalization filter 232 will compensate for unwanted characteristics in the response of the VCM plant 234. As a result, the feedback response input to the servo control module 230 will be closer to the response for which the servo control 230 was designed. Using equation (1), an equalization filter 232 may be generated for each of m heads in the disc drive 100.

Occasionally, frequencies of resonance modes will vary for a particular head from one zone to another as the head moves radially over the surface of the disc. A zone, as used in this context means any range of tracks, and does not necessarily refer to the recording zones of the disc. Thus, it is envisioned that more than one equalization filter may be developed and stored for each head of the disc drive. To do so, a transfer function $P_{mi}(z)$ can be determined for each of 'i' zones in which a recording head 'm' may be positioned. An equalization transfer function $E_{mi}(z)$ may then be developed for each of the 'i' zones for each of the 'm' heads.

In one embodiment, the discrete-time domain transfer function $E_m(z)$ is implemented using a state-space implementation. A state-space implementation is described in U.S. Pat. No. 6,101,058 issued to John C. Morris, entitled "Method of Implementing a Linear Discrete-Time State-Space Servo Control System on a Fixed-Point Digital Signal Processor in a Disc Drive," which is hereby incorporated for all that it teaches and discloses. Those skilled in the art will readily recognize how to implement the function $E_m(z)$ using the teachings of U.S. Pat. No. 6,101,058.

Figure 5:
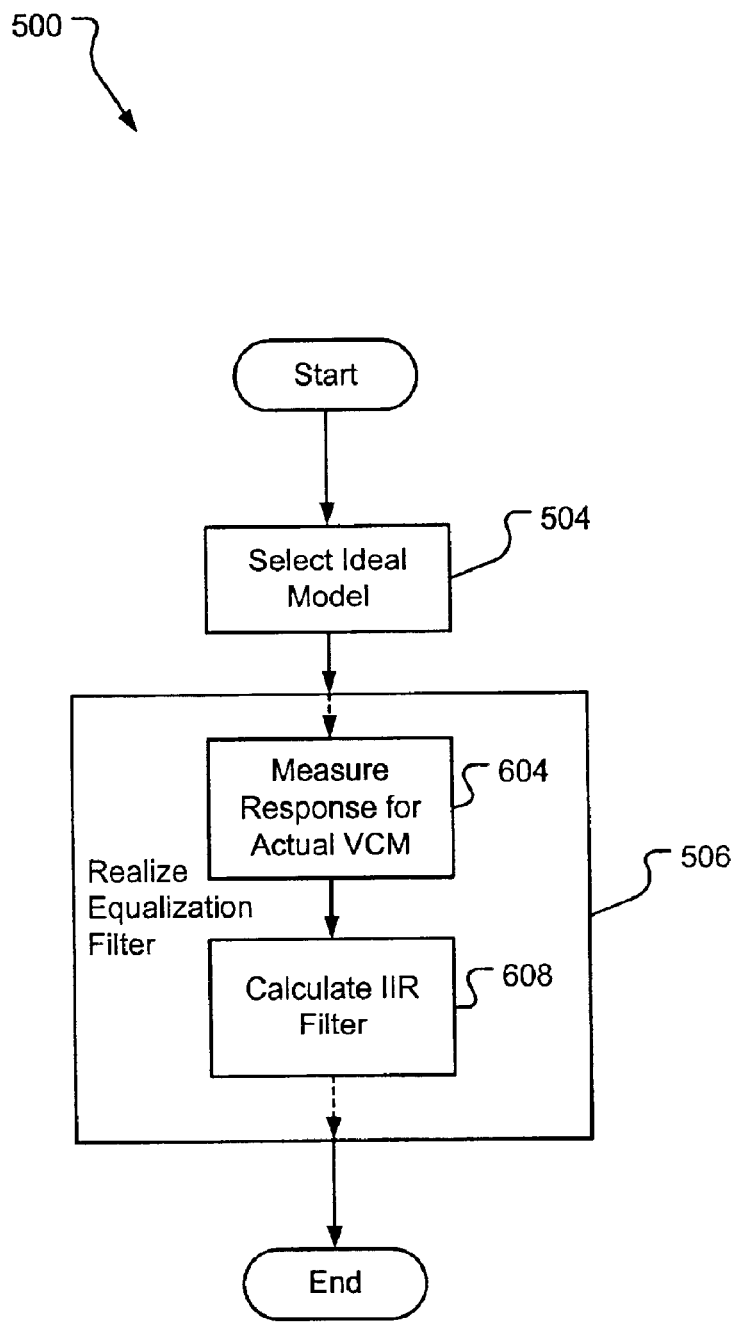
FIG. 5 is a high level flow diagram illustrating exemplary steps for regulating the response of the VCM plant of FIG. 2.

FIG. 5 is a high level flow diagram 500 illustrating exemplary steps for regulating the VCM plant response. Initially, an ideal VCM plant model is selected in a selecting operation 504. The ideal VCM plant model is preferably an analytical transfer function that exhibits an optimal frequency response. In one implementation, the ideal plant model is universal for all heads in the disc drive plant. In other words, the response characterized by the ideal model is the response that the designer desires the heads to exhibit. Thus, the ideal model depends on the design and criteria to be optimized. Software programs exist in the art that can be used to select and develop the ideal model. The software programs can generate analytical constants that characterize the transfer function for the ideal model. Those constants are stored in memory in the disc drive to be used later in regulating the plant transfer function. The ideal model is selected and developed either before manufacture of the disc drive or experimentally during the manufacture of the disc drive.

After the ideal model has been selected and constants have been stored in memory, control transfers to a realizing operation 506, which realizes one or more equalization filters to be implemented in the servo loop 200. The realizing operation 506 uses the ideal model constants to generate an equalization filter. In general terms, the realizing operation 506 detects the actual response of the VCM plant 234 at a number of frequencies, compares the actual response to the ideal model response at those same frequencies, and generates a transfer function for the equalization filter. The transfer function generated in the realizing operation 506 may be viewed as including the poles and zeros necessary to counteract the effects of resonance and disturbance in the VCM plant 234, such that the overall response to the control signal 308 is a substantially ideal response.

The ideal plant transfer function $\tilde{P}(z)$ is given with the general formula:

$$\tilde{P}(z) = e^{-z\tilde{T}} \frac{\tilde{K}}{z^2} \frac{\tilde{w}^2}{z^2 + 2\tilde{\xi}\tilde{w}z + \tilde{w}^2}, \tag{2}$$

where $\tilde{K}$ and $\tilde{T}$ are desired DC gain and computational/electronics delay, respectively. The values $\tilde{\xi}$ and $\tilde{w}$ are the desired damping ratio and the desired natural frequency, respectively.

The ideal transfer function shown in equation (2) may be viewed as characterizing that portion of the structural dynamics in the VCM plant of the disc drive 100 that does not vary significantly from part to part. In other words, it may be viewed as a transfer function for a rigid body system having one or more fundamental resonance modes, for which the servo control module 230 is designed. One skilled in the art will readily recognize how an ideal transfer function can be derived. By way of example, and not limitation, the transfer function in equation (2) may be determined by testing a small population of disc drives that are known to exhibit a substantially ideal response, and that are substantially static in their response. After gathering a desired number of data points that characterize the response of the substantially ideal transfer function, the data points may be fitted to a curve. Computer software known in the art may then be run on a computer to derive the analytical expression for $\tilde{P}(z)$ shown in equation (2).

Referring again to FIG. 5, parameters that define the ideal model determined in the selecting operation 504 are input to the realizing operation 506. In one embodiment of the realizing operation 506, a measuring operation 604 measures the actual response of the VCM plant 234. Preferably the measuring operation 604 is performed by inputting a sinusoid signal at a number of frequencies and detecting the frequency response of the VCM plant 234. The frequency response data that is measured is preferably point wise numerical data that may be used to compare to ideal model response data to generate an equalization filter transfer function. For example, sinusoid signals at varying frequencies may be input servo control loop and the response detected. The sinusoid signals may range in frequency from 100 Hz to half of the disc drive sampling frequency, located at 10 Hz increments. The frequency response of the VCM plant 234 may be measured at each 10 Hz increment. Thus, a plurality of point data is generated in the measuring operation 604. The plurality of point data is preferably stored in memory for the next step.

The next step is a calculating operation 608, which calculates an equalization filter. The equalization filter is an infinite impulse response (IIR) filter that compensates for the deviations between the response of an ideal model and the actual VCM plant 234. An equalization filter is calculated for each head in the disc drive and stored in memory for use during operation. The method steps illustrated in the flow diagram 500 may be executed at manufacturing time, and subsequently re-executed within the disc drive at other selected times. For example, the equalization filter transfer function could be recomputed during selected recovery modes. Additionally, where practical, the equalization filter could be recomputed during every power up sequence.

Figure 6:
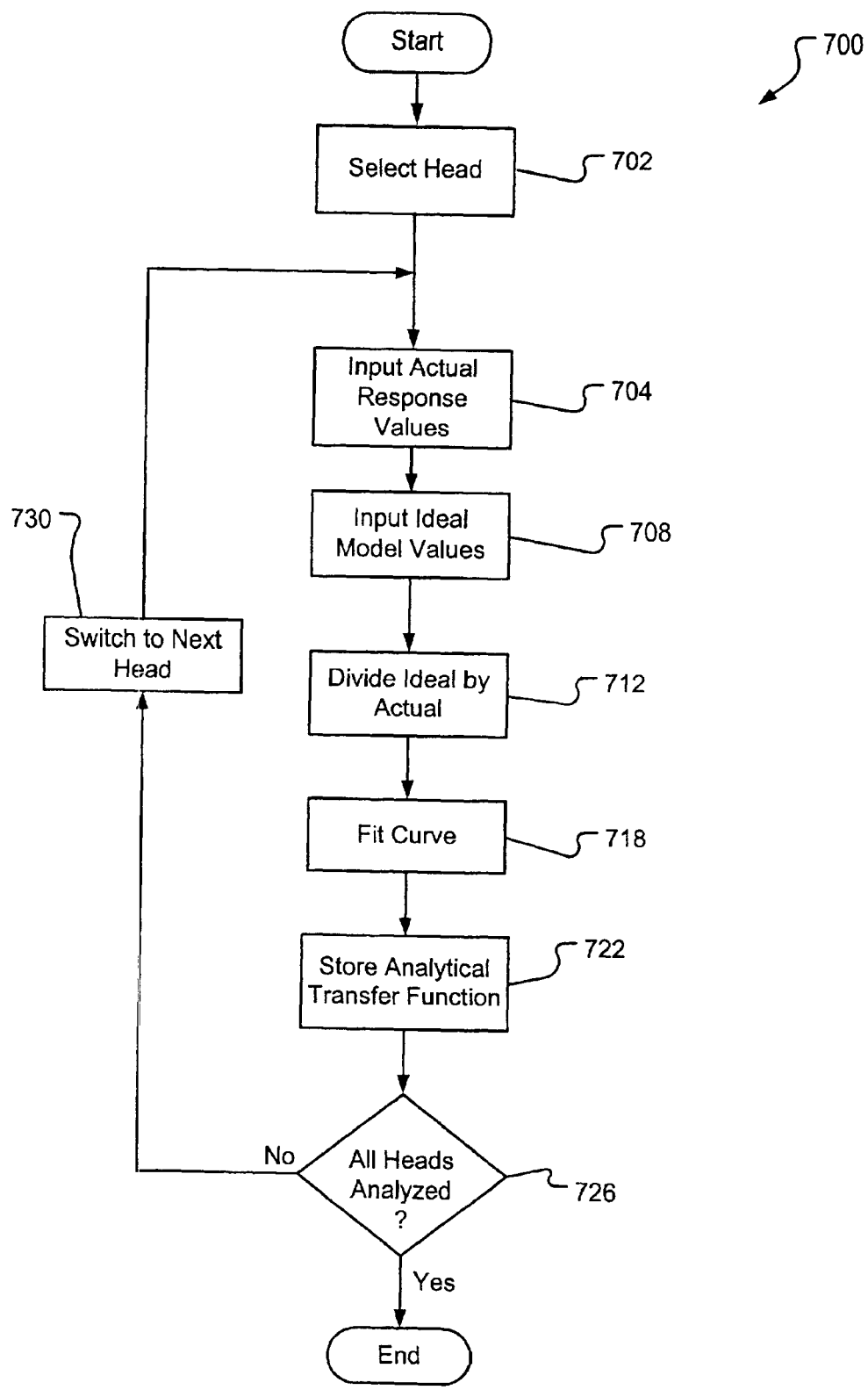
FIG. 6 is a detailed flow diagram illustrating exemplary operations that may be employed to realize the equalization filter illustrated in FIGS. 2–3.

FIG. 6 is a flow diagram 700 illustrating exemplary steps that may be employed in the disc drive 100 to generate one or more equalization filters 232. A selecting operation selects a transducer head 118 in the disc drive for which an associated equalization filter 232 will be generated. An inputting operation 704 inputs actual response values obtained from the VCM plant 234 corresponding to the selected head 118. The actual response values that are input may be values that are output from the VCM transfer function 318 shown in FIG. 3. The values may be viewed as all of the values on the non-equalized response curve 416 shown in FIG. 4. The actual response values are obtained by inputting to the servo control loop 200 a set of sinusoidal signals having predetermined frequencies within a frequency range. For every actual response value, there is an associated ideal response value at an associated frequency, as illustrated in the plots in FIG. 4.

Thus, after the actual response values are input, control transfers to a second input operation 708 wherein ideal model frequency response values are input. The ideal model values are preferably read out of memory where they was previously stored during manufacture based on the desired ideal response (e.g., the ideal response 414). The ideal response values are the same for every head 118 in the disc drive 100. The ideal response and its associated transfer function are described with respect to equation (2). After the actual response value and the ideal model value are input, control transfers to a dividing operation 712 wherein the ideal model values are divided by the actual response values. The quotients derived in the dividing operation 712 are preferably stored in memory to be used later.

In one embodiment, the inputting operations 704 and 708, and the dividing operation 712, are performed in an iterative fashion. First, an actual response value is input in the inputting operation 704. Then an ideal model value is input in the inputting operation 708. The ideal value is then divided by the actual value in the dividing operation 712. The quotient from the dividing operation 712 is stored. In this particular embodiment, the operations 704, 708, and 712 are repeated for every set of ideal and actual values. The plurality of stored quotients are then used to derive a frequency response of the equalization filter 232. One way of deriving the frequency response of the equalization filter 232 is to fit the quotients to a curve.

Control transfers to a fitting operation 718 wherein all of the stored quotients from the dividing operation 712 are fitted to a curve. Software algorithms are available and readily apparent to those skilled in the art for fitting a curve in the fitting operation 718. The fitting operation 718 involves deriving an analytical function for the fitted curve. After the analytical function is derived, control transfers to a storing operation 722, wherein the derived analytical transfer function is stored in memory. The analytical transfer function that is stored typically involves storing a number of coefficients that characterize the transfer function. The stored transfer function represents the equalization filter 232 discussed earlier. Control then transfers to a determining operation 726 wherein it is determined whether all of the heads have been analyzed for their response. If it is determined that one or more heads remain to be analyzed, control transfers to a switching operation 730 wherein the disc drive 100 switches to the next head. After the switching operation 730, control transfers back to the inputting operation wherein an actual response values for the next head are input for processing. If all the heads have been analyzed in the determining operation 726, processing ends.

Figure 7:
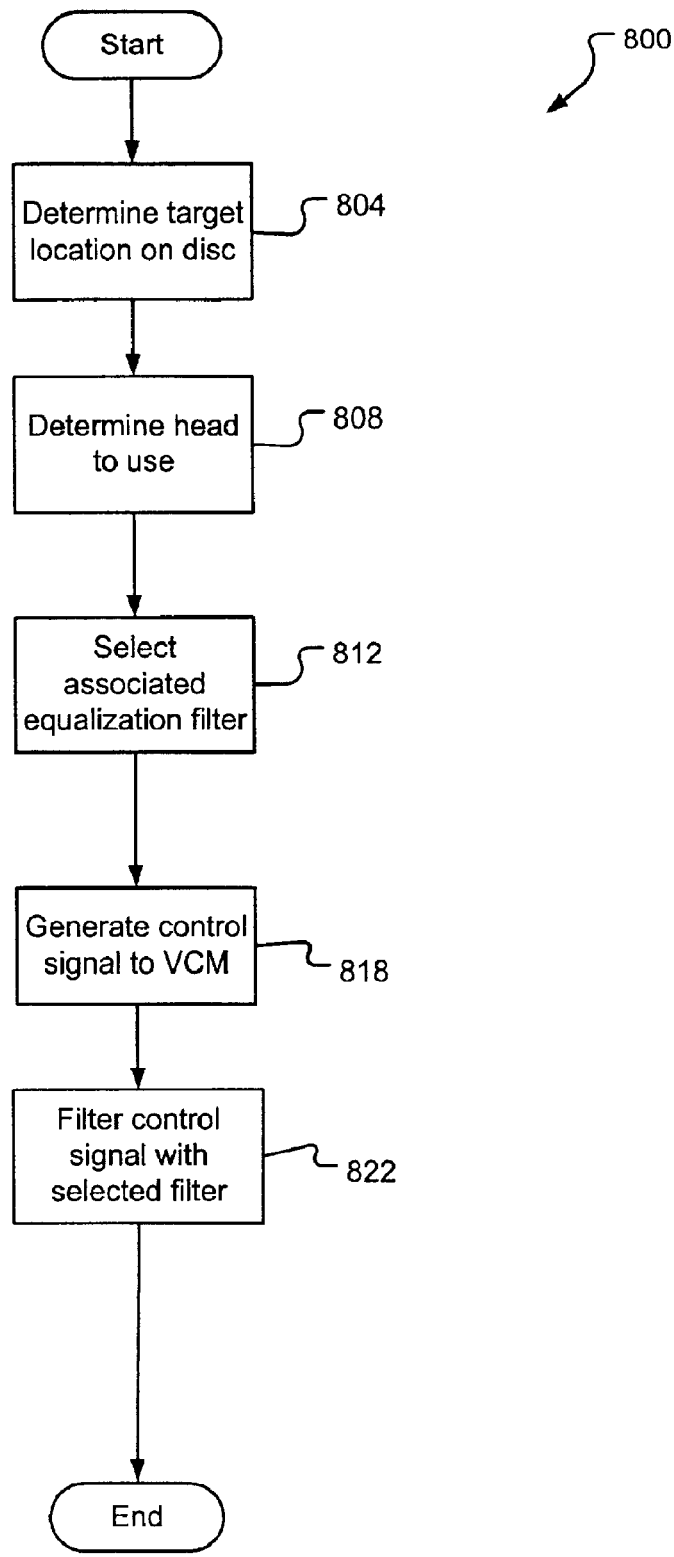
FIG. 7 is a flow diagram illustrating exemplary operations carried out during disc drive operation employing an equalization filter.

FIG. 7 is a flow diagram 800 illustrating exemplary method steps employed during the operation of the disc drive 100 to position a transducer head 118 and utilizing an equalization filter 232. Control initially transfers to a determining 804 wherein a target location on the disc 108 is determined. The target location is typically based on a read or write command to access the disc 108, and is associated with a logical block address. After the target location is determined, control transfer transfers to a determining operation 808 wherein it is determined which of the transducer heads 118 will be used to access the target location. Control then transfers to a selecting operation 812 identifying and retrieving an equalization filter associated with the determined head in operation 808 is selected. For each head in the disc drive 100, there is an equalization filter 232 adapted for resonance modes by the head 118. Thus, in the selecting operation 812, a particular equalization filter 232 is selected that corresponds to the head that will be used to access the target location on a target track (e.g., track 120).

In response to the seek command 819 to the VCM, the read/write head is positioned close to the target track. Following the completion of the seek command, the actuator is in a track-follow mode, wherein a primary objective is to maintain the position of the read/write head over the target track with minimum error. In the track-follow mode, control then transfers to a generating operation 818 wherein a control signal is generated to the VCM plant 234 to adjust the position of the head closely to the target location. Control then transfers to a filtering operation 822 wherein the control signal is filtered using the equalization filter selected in the selecting operation 812. In the filtering operation 822, a filtered control signal is transmitted to the VCM, to energize the VCM for maintaining the position of the transducer head 118 over the target track. Advantageously, the resonance modes associated with the head that is used to access the target track, are attenuated by the selected equalization filter that is designed to counteract those particular resonance modes. The method steps illustrated in FIG. 7 are typically iterated every time the disc is to be accessed in response to a disc access command.

The method steps illustrated in FIGS. 5–7 may be implemented in firm ware in the disc drive or in a computer connected to a disc drive. Additionally, the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

To summarize, an embodiment of the present invention may be viewed as a method of regulating a response of a voice coil motor plant (such as 234) in a disc drive (such as 100) by selecting an ideal response (such as 414), measuring an actual response (such as 416) of the voice coil motor plant (such as 234) at predetermined frequencies, and realizing (such as 506) an equalization filter (such as 232) for offsetting the unwanted resonance modes based on the ideal response (such as 414) and the actual response (such as 414). The method may further include dividing (such as 712) ideal response values (such as 414) by corresponding actual response values (such as 416) to yield equalized response values (such as 418) characteristic of an equalized response.

Another embodiment is a disc drive (such as 100) having a servo control module (such as 230) and a voice coil motor (VCM) plant (such as 234). The disc drive (such as 100) has memory (such as 212) storing predetermined ideal VCM plant response parameters representing an ideal VCM plant response (such as 414) for which the servo control module (such as 230) is designed to interact. The disc drive (such as 100) further includes a measuring module (such as 210) operable to measure an actual VCM plant response (such as 416) and a realizing module (such as 210) operable to generate an equalization filter (such as 232) for filtering resonance modes that are in the actual VCM plant response (such as 416) but not in the ideal VCM plant response (such as 414).

Yet another embodiment may be viewed as a method employed in a disc drive (such as 100) for controlling the transducer head (such as 118) by inputting (such as 704) actual voice coil motor plant response values, which represent a frequency response (such as 416) of an actual VCM plant (such as 234) to one or more sinusoidal signal(s) at predetermined frequencies. The method further involves inputting (such as 708) ideal VCM plant model values that represent an ideal VCM plant model frequency response (such as 415) at the predetermined frequencies. The method further involves determining (such as 608) relative differences between the ideal VCM plant model values and the actual VCM plant values at each of the predetermined frequencies, and realizing (such as 506, 718, and 722) an equalization filter (such as 232) that when working in combination with the actual VCM plant (such as 234), the combination yields a response (such as 418) that is substantially equal to the ideal VCM plant model response (such as 415). In one embodiment, determining (such as 608) the relative differences between ideal (such as 415) and actual (such as 416) responses may involve dividing (such as 712) each of the ideal VCM plant model values with an associated actual VCM plant value to yield a plurality of equalization values. In an embodiment, realizing (such as 506) the equalization filter (such as 232) involves fitting (such as 718) the equalization values to a curve, deriving an analytical function that defines the curve, and storing (such as 722) parameters associated with the analytical function to be used during operation as the equalization filter (such as 232).

It will be clear that the present invention is well adapted to attain the ends and advantages mentioned as well as those inherent therein. While a presently preferred embodiment has been described for purposes of this disclosure, various changes and modifications may be made which are well within the scope of the present invention. For example, the equalization filter could be employed in other (non-disc drive) environments where mechanical resonance modes arise and reduce performance of servo control. Additionally, analog versions of the equalization filter may be suitable for analog environments and may be readily apparent to those skilled in the art. Numerous other changes may be made which will readily suggest themselves to those skilled in the art and which are encompassed in the spirit of the invention disclosed and as defined in the appended claims.

What is claimed is:

1. A method of regulating a response of a voice coil motor plant comprising steps of:
    (a) selecting an ideal response representative of a frequency response characteristic of an ideal voice coil motor plant;
    (b) measuring an actual response of the voice coil motor plant to one or more sinusoid signal(s), each at a predetermined frequency, wherein the actual response exhibits one or more unwanted resonance mode(s) that are not found in the ideal response; and
    (c) realizing an equalization filter for offsetting the one or more unwanted resonance mode(s) based on the ideal response and the actual response.

2. The method of claim 1 wherein the realizing step (c) comprises a step of:
    (c)(1) dividing a value corresponding to the ideal response by a value corresponding to the actual response to yield an equalized response value that is characteristic of an equalized response.

3. The method of claim 2 further comprising steps of:
    (c)(2) deriving an equalization transfer function based on the equalized response value.

4. The method of claim 2 further comprising:
    (d) storing the equalized response value;
    (e) repeating steps (a)–(d) to create a plurality of stored equalized response values;
    (f) fitting the equalized response values to a curve; and
    (g) deriving an equalization filter transfer function based on the fitted curve.

5. The method of claim 1 further comprising steps of:
    (d) storing parameters for the equalization filter in a storage device to filter a control signal from a servo controller.

6. The method of claim 1 further comprising steps of:
    (d) realizing an equalization filter associated with each of a plurality of transducer heads in a servo control loop of a storage device.

7. The method of claim 6 further comprising steps of:
    (e) storing parameters for each of the equalization filters;
    (f) sending a control signal to the voice coil motor plant to position one of the transducer heads over a target location; and
    (g) filtering the control signal with the one of the equalization filters associated with the one of the transducer heads.

8. A storage device having a servo control module and an actual voice coil motor (VCM) plant, the disc drive comprising:
    memory storing predetermined ideal VCM plant response parameters representing a response of an ideal VCM plant for which the servo control module is designed to interact;
    a measuring module operable to measure an actual VCM plant response representing the response of the actual VCM plant to a control signal; and
    a realizing module operable to generate an equalization filter for filtering one or more resonance mode(s) that are in the actual VCM plant response but are not in the ideal VCM plain response.

9. The disc drive of claim 8 wherein in the equalization filter comprises a transfer function comprising a combination of values in the actual VCM plant response and values in the ideal VCM plant response.

10. The disc drive of claim 8 wherein the actual VCM plant comprises one or more transducer head(s), each exhibiting a unique head response that contributes to the plant response, the disc drive further comprising:
- an equalization filter associated with each of the one or more head(s) to counteract one or more non-ideal resonance mode(s) in each of the unique head responses, such that the combination of the equalization filter response and the actual VCM plant response for all heads is substantially ideal.

11. The disc drive of claim 10 wherein one of the heads exhibits a head response having a first resonance mode at a first frequency within a first zone and a second resonance mode at a second frequency in a second zone, the first and second resonance modes being different, the disc drive further comprising a first equalization filter equalizing the first resonance mode coupled to the head when the head is positioned in the first zone, and a second equalization filter equalizing the second resonance mode coupled to the head when the head is positioned in the second zone.

12. The disc drive of claim 8 wherein the equalization filter is a discrete-time domain filter defined by state-space variables.

13. The disc drive of claim 12 wherein the ideal VCM plant response has an analytical form:

$$\tilde{P}(z) = e^{-z\tilde{T}} \frac{\tilde{K}}{z^2} \frac{\tilde{w}^2}{z^2 + 2\tilde{\xi}\tilde{w}z + \tilde{w}^2}.$$

14. A storage device having a servo controller generating a control signal to a voice coil motor (VCM) plant exhibiting response to a control signal, the storage device comprising:
- a demodulator receiving a head motion signal from the VCM plant and generating a position error signal (PES);
- a means for equalizing variation in the PBS based on an ideal response for which the servo controller is designed.

15. The storage device of claim 14 wherein the means for equalizing the response comprises:
- an equalization filter having an equalizing transfer function that is a combination of a plant transfer function of the VCM plant and an ideal transfer function of an ideal VCM plant model.

16. The storage device of claim 15 further comprising an equalization filter for each of a plurality of transducer heads in the storage device.

17. The storage device of claim 16 wherein the ideal response has the analytical form:

$$\tilde{P}(z) = e^{-z\tilde{T}} \frac{\tilde{K}}{z^2} \frac{\tilde{w}^2}{z^2 + 2\tilde{\xi}\tilde{w}z + \tilde{w}^2},$$

wherein $\tilde{K}$ is a desired DC gain, $\tilde{T}$ is a computational/electronics delay factor, $\tilde{\xi}$ is a desired damping ratio, and $\tilde{w}$ is a desired natural frequency.

18. A method of controlling a transducer head comprising steps of:
- (a) inputting actual voice coil motor plant response values representing a frequency response of an actual VCM plant to one or more sinusoidal signal(s), each at a predetermined frequency;
- (b) inputting ideal VCM plant model values representing a frequency response of an ideal VCM plant to one or more sinusoidal signal(s), each at the predetermined frequency;
- (c) determining relative differences between the ideal VCM plant model values and the actual VCM plant values at each of the predetermined frequencies; and
- (d) realizing an equalization filter that when working in combination with the actual VCM plant, the combination yields a response that is substantially equal to the ideal VCM plant model response.

19. The method of claim 18 wherein the determining step (c) comprises a step of:
- (c)(1) dividing each of the ideal VCM plant model values with an associated actual VCM plant value to yield a plurality of equalization values.

20. The method of claim 19 wherein the realizing step comprises steps of:
- (d)(1) fitting the equalization values to a curve;
- (d)(2) deriving an analytical function that defines the curve; and
- (d)(3) storing parameters associated with the analytical function to be used during operation as the equalization filter.

21. The method of claim 20 further comprising steps of:
- (e) determining whether an equalization filter has been realized for each of a plurality of transducer heads in a storage device; and
- (f) if an equalization filter has not been realized for each of a plurality of transducer heads, switching to a next head and repeating steps (a) through (d) for the next head.

* * * * *